(12) United States Patent
Fujiki et al.

(10) Patent No.: US 12,113,816 B2
(45) Date of Patent: Oct. 8, 2024

(54) ANOMALY DETECTION DEVICE, ANOMALY DETECTION METHOD AND ANOMALY DETECTION PROGRAM

(71) Applicant: NIPPON TELEGRAPH AND TELEPHONE CORPORATION, Tokyo (JP)

(72) Inventors: Naoto Fujiki, Musashino (JP); Takuya Minami, Musashino (JP); Masanori Shinohara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 478 days.

(21) Appl. No.: 17/626,817

(22) PCT Filed: Jul. 23, 2019

(86) PCT No.: PCT/JP2019/028912
§ 371 (c)(1),
(2) Date: Jan. 13, 2022

(87) PCT Pub. No.: WO2021/014592
PCT Pub. Date: Jan. 28, 2021

(65) Prior Publication Data
US 2022/0263737 A1 Aug. 18, 2022

(51) Int. Cl.
*H04L 9/40* (2022.01)
*H04L 43/04* (2022.01)
*H04L 43/16* (2022.01)

(52) U.S. Cl.
CPC .......... *H04L 63/1425* (2013.01); *H04L 43/04* (2013.01); *H04L 43/16* (2013.01)

(58) Field of Classification Search
CPC ..... H04L 43/04; H04L 43/16; H04L 63/1425; H04L 41/142; H04L 12/4625;
(Continued)

(56) References Cited

U.S. PATENT DOCUMENTS 8,724,487 B1 * 5/2014 Aitken ................. H04L 43/026
370/252
10,419,469 B1 * 9/2019 Singh ................. G06F 16/9535
(Continued)

FOREIGN PATENT DOCUMENTS

CN 104769884 A * 7/2015 ......... H04L 12/4625
CN 103081407 B * 11/2015 ............ H04L 41/06
(Continued)

OTHER PUBLICATIONS

Kingma et al., "Auto-Encoding Variational Bayes", Available Online at:https://arxiv.org/abs/1312.6114, May 1, 2014, 14 pages.

*Primary Examiner* — Shahriar Zarrineh
(74) *Attorney, Agent, or Firm* — XSENSUS LLP

(57) ABSTRACT

An acquisition unit acquires a communication feature for normal communication of communication equipment. If a data count or a data acquisition period for the acquired communication feature exceeds a predetermined value, an amplification unit amplifies the data count for the communication feature by a plurality of predetermined schemes in accordance with data counts for respective groups, each group sharing a same 5-tuple. A creation unit creates, for each of the predetermined schemes, reference value information for normal communication of the communication equipment through learning using the amplified communication feature. A determination unit determines accuracy of abnormality detection for each of the predetermined schemes using an anomaly score representing a deviation of test data representing a communication feature for abnormal communication from the reference value information. A selection unit selects the reference value information created by one of the schemes, the determined accuracy for which is highest.

8 Claims, 9 Drawing Sheets

(58) Field of Classification Search
CPC ... H04L 43/08; H04L 43/0876; H04L 43/103; H04L 43/50
See application file for complete search history.

(56) References Cited

U.S. PATENT DOCUMENTS

| | | | |
|---|---|---|---|
| 10,567,245 B1* | 2/2020 | Patil | H04L 69/22 |
| 10,931,689 B2* | 2/2021 | El-Moussa | H04L 63/1416 |
| 2016/0350173 A1* | 12/2016 | Ahad | H04L 67/02 |
| 2017/0149808 A1* | 5/2017 | Hamada | H04L 12/66 |
| 2017/0230396 A1* | 8/2017 | Hamada | H04L 63/029 |
| 2017/0250953 A1* | 8/2017 | Jain | G06F 21/552 |
| 2018/0270132 A1* | 9/2018 | Hashimoto | H04L 43/0823 |
| 2018/0375887 A1* | 12/2018 | Dezent | H04L 43/08 |
| 2019/0095300 A1* | 3/2019 | Oba | G05B 23/0281 |
| 2019/0190938 A1* | 6/2019 | Oba | H04L 43/16 |

FOREIGN PATENT DOCUMENTS

| | | | | |
|---|---|---|---|---|
| JP | 2018148350 A | * | 9/2018 | |
| JP | 2019003533 A | * | 1/2019 | |
| JP | 2019004284 A | * | 1/2019 | |
| JP | 6734228 B2 | * | 8/2020 | |
| JP | 7109391 B2 | * | 7/2022 | G06N 20/20 |
| JP | 7131705 B2 | * | 9/2022 | H04L 43/026 |
| KR | 20210002907 A | * | 1/2021 | |
| WO | WO-2016022505 A1 | * | 2/2016 | H04L 43/16 |

\* cited by examiner

Fig. 3

| ITEM NO | COMMUNICATION FEATURE ITEM |
|---|---|
| 1 | SOURCE MAC ADDRESS |
| 2 | DESTINATION MAC ADDRESS |
| 3 | SOURCE IP ADDRESS |
| 4 | SOURCE PORT NUMBER |
| 5 | DESTINATION IP ADDRESS |
| 6 | DESTINATION PORT NUMBER |
| 7 | PROTOCOL |
| 8 | TOTAL UPSTREAM PACKET COUNT |
| 9 | TOTAL UPSTREAM BYTE COUNT |
| 10 | AVERAGE UPSTREAM PACKET SIZE |
| 11 | AVERAGE UPSTREAM FLOW RATE |
| 12 | TOTAL DOWNSTREAM PACKET COUNT |
| 13 | TOTAL DOWNSTREAM BYTE COUNT |
| 14 | AVERAGE DOWNSTREAM PACKET SIZE |
| 15 | AVERAGE DOWNSTREAM FLOW RATE |
| 16 | COMMUNICATION TIME PERIOD |

Fig. 4

| ITEM NO | COMMUNICATION FEATURE ITEM | GROUP 1 | GROUP 2 | GROUP 3 | GROUP 4 | GROUP 5 |
|---|---|---|---|---|---|---|
| 1 | SOURCE MAC ADDRESS | 11:22:33:44:55:66 | 11:22:33:44:55:66 | 11:22:33:44:55:66 | 11:22:33:44:55:66 | 11:22:33:44:55:66 |
| 2 | SOURCE MAC ADDRESS | 11:11:11:11:11:11 | 22:22:22:22:22:22 | 33:33:33:33:33:33 | 44:44:44:44:44:44 | 55:55:55:55:55:55 |
| 3 | SOURCE IP ADDRESS | 10.1.1.1 | 10.1.1.1 | 10.1.1.1 | 10.1.1.1 | 10.1.1.1 |
| 4 | SOURCE PORT NUMBER | any | any | any | any | 137 |
| 5 | DESTINATION IP ADDRESS | 10.10.10.1 | 10.20.20.1 | 10.30.30.1 | 10.40.40.1 | 10.50.50.1 |
| 6 | DESTINATION PORT NUMBER | 80 | 443 | 22 | 53 | 137 |
| 7 | PROTOCOL | 6 | 6 | 6 | 17 | 17 |
| 8 | AVERAGE OF TOTAL UPSTREAM PACKET COUNTS | 10 | 20 | 30 | 5 | 2 |
| 9 | AVERAGE OF TOTAL UPSTREAM BYTE COUNTS | 100 | 200 | 300 | 10 | 10 |
| 10 | AVERAGE OF AVERAGE UPSTREAM PACKET SIZES | 10 | 10 | 10 | 2 | 5 |
| 11 | AVERAGE OF AVERAGE UPSTREAM FLOW RATES | 1 | 2 | 3 | 0.5 | 0.2 |
| 12 | AVERAGE OF TOTAL DOWNSTREAM PACKET COUNTS | 10 | 20 | 30 | 5 | 2 |
| 13 | AVERAGE OF TOTAL DOWNSTREAM BYTE COUNTS | 1000 | 2000 | 3000 | 1 | 1 |
| 14 | AVERAGE OF AVERAGE DOWNSTREAM PACKET SIZES | 100 | 200 | 300 | 0.2 | 0.5 |
| 15 | AVERAGE OF AVERAGE DOWNSTREAM FLOW RATES | 1 | 2 | 3 | 1 | 1 |
| 16 | AVERAGE OF COMMUNICATION TIME PERIODS | 30 | 40 | 50 | 1 | 1 |
| 17 | COUNT | 10 | 20 | 30 | 4 | 2 |

Fig. 5

|  | COPY SCHEME | ADJUSTMENT SCHEME |
|---|---|---|
| SIMPLE AMPLIFICATION MODE | PREPROCESSING SCHEME A | PREPROCESSING SCHEME B |
| EQUAL AMPLIFICATION MODE | PREPROCESSING SCHEME C | PREPROCESSING SCHEME D |

ANOMALY DETECTION DEVICE, ANOMALY DETECTION METHOD AND ANOMALY DETECTION PROGRAM

CROSS-REFERENCE TO RELATED APPLICATION

The present application is based on PCT filing PCT/JP2019/028912, filed Jul. 23, 2019, the entire contents of which are incorporated herein by reference.

TECHNICAL FIELD

The present invention relates to an abnormality detection device, an abnormality detection method, and an abnormality detection program.

BACKGROUND ART

An anomaly-based abnormality detection technique is known as a technique for monitoring traffic flowing through a network and detecting an abnormality, such as security-threatening unauthorized access (see Non-Patent Literature 1). In the anomaly-based abnormality detection technique, an abnormality is detected by learning, through machine learning, a statistical tendency of normal communication information, creating and holding reference value information, and comparing the reference value information with communication information flowing through a network.

That is, the anomaly-based abnormality detection technique uses a deviation from a normal condition to determine an abnormal condition. For this reason, in contrast to the fact that a signature-based one which detects unauthorized access by comparing a pattern (signature) at the time of unauthorized access registered in advance with a packet flowing through a network requires updating of a signature file, the anomaly-based one can detect unknown unauthorized access.

CITATION LIST

Non-Patent Literature

Non-Patent Literature 1: D. P. Kingma et al., "Auto-Encoding Variational Bayes", [online], 2014, ICLR, [retrieved on Jun. 20, 2019], from the Internet: <URL: https://arxiv.org/abs/1312.6114>

SUMMARY OF THE INVENTION

Technical Problem

However, there may be cases in which anomaly-based abnormality detection is difficult to do according to conventional techniques. For example, for an anomaly-based abnormality detection technique, it is necessary to collect, in advance, a fixed quantity of communication information at the time of normal operation and obtain reference value information, so that it is difficult to connect communication equipment to a network and immediately monitor the network. If the quantity of collected communication information is small or a communication pattern is biased, proper reference value information cannot be obtained, which reduces the accuracy of abnormality detection. Since communication patterns generally differ by communication equipment, the accuracy of abnormality detection is low with just a single piece of reference value information.

Additionally, it is difficult to easily determine whether reliable abnormality detection is possible, after creation of reference value information.

An object of the present invention, which has been made in view of the above, is to facilitate anomaly-based abnormality detection.

Means for Solving the Problem

In order to solve the above-described problems and achieve the object, an abnormality detection device according to the present invention includes an acquisition unit which acquires a communication feature for normal communication of communication equipment, an amplification unit which, if a data count or a data acquisition period for the acquired communication feature exceeds a predetermined value, amplifies the data count for a communication feature by a plurality of predetermined schemes in accordance with data counts for respective groups, each group sharing a same 5-tuple, a creation unit which creates, for each of the predetermined schemes, reference value information for normal communication of the communication equipment through learning using the amplified communication feature, a determination unit which determines accuracy of abnormality detection for each of the predetermined schemes using an anomaly score representing a deviation of test data representing a communication feature for abnormal communication from the reference value information, and a selection unit which selects the reference value information created by one of the schemes, the determined accuracy for which is highest.

Effects of the Invention

According to the present invention, it is possible to facilitate anomaly-based abnormality detection.

BRIEF DESCRIPTION OF DRAWINGS

FIG. 3 is a chart for explaining a communication feature.

FIG. 4 is a chart for explaining a combined group-unit communication feature.

FIG. 5 is a chart for explaining processing by an amplification unit.

DESCRIPTION OF EMBODIMENTS

Figure 1:
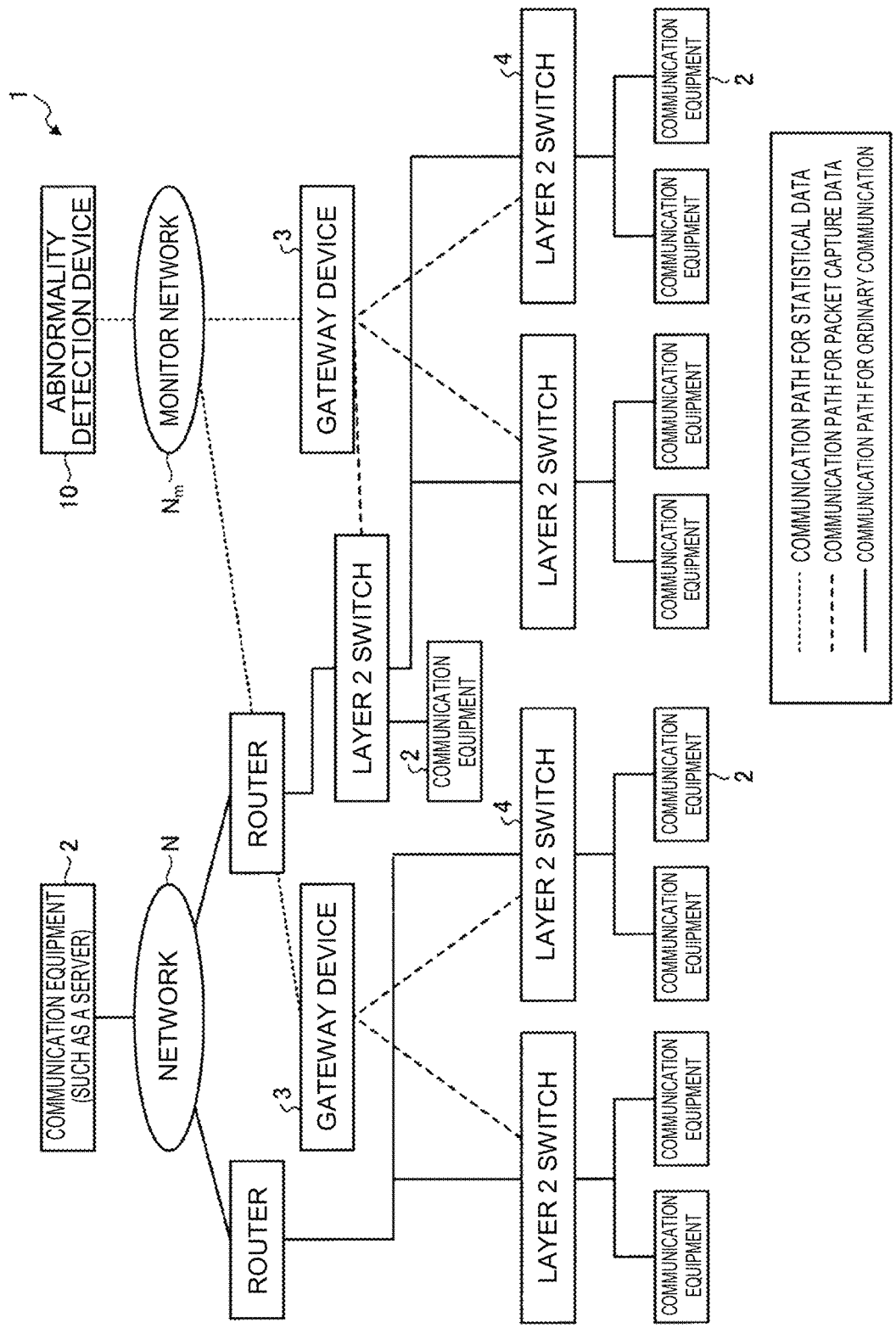
FIG. 1 is a diagram for explaining a system including an abnormality detection device according to the present embodiment.

An embodiment of the present invention will be described below in detail with reference to the drawings. Note that the present invention is not limited by the embodiment. In the drawings, same portions are denoted by same reference numerals.

[System Configuration]

FIG. 1 is a diagram for explaining a system including an abnormality detection device according to the present embodiment. As shown in FIG. 1, a system 1 has pieces 2 of communication equipment which are objects of abnormality detection processing, gateway devices 3, layer 2 switches 4, and an abnormality detection device 10.

The gateway device 3 is installed at a border between the communication equipment 2 and a network N, such as the Internet. The gateway device 3 acquires communication data and an operation log in relation to communication of the communication equipment 2 with the different communication equipment 2 connected to a same LAN (Local Area Network) or the communication equipment 2, such as a server device, connected to the network N. The layer 2 switch 4 performs packet capture and outputs communication data to the gateway device 3 by means of a mirror port.

The abnormality detection device 10 acquires statistical data of each piece 2 of communication equipment from the gateway device 3 and performs abnormality detection processing (to be described later). For example, the abnormality detection device 10 learns behavior of normal operation using a communication feature and an operation log at the time of normal operation of the communication equipment 2 and creates reference value information. Also, the abnormality detection device 10 performs abnormality monitor processing which monitors a communication feature of the communication equipment 2 via a monitor network $N_m$ and detects an abnormality, such as unauthorized access or virus infection.

[Configuration of Abnormality Detection Device]

Figure 2:
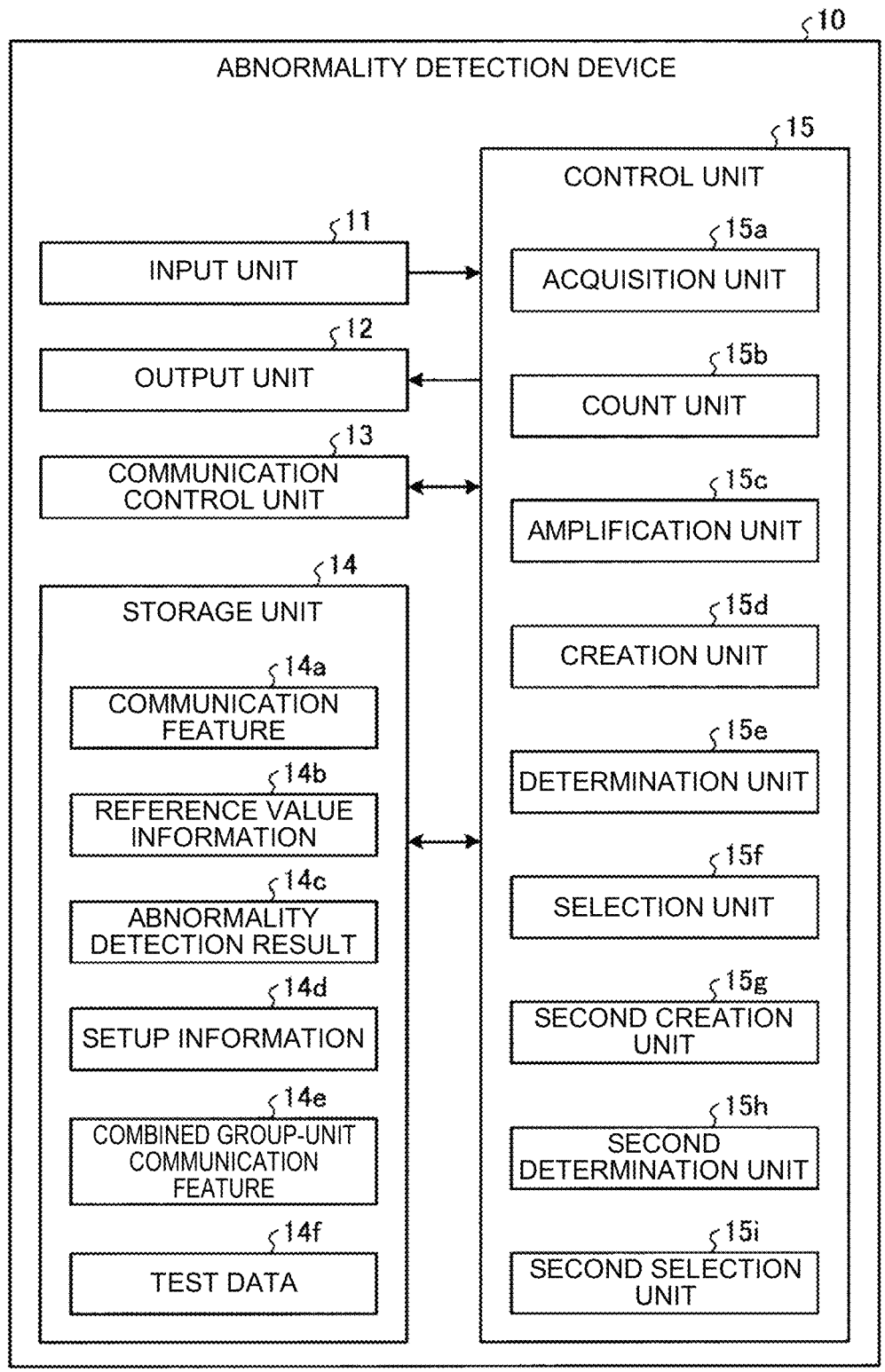
FIG. 2 is a schematic diagram illustrating a schematic configuration of the abnormality detection device according to the present embodiment.

FIG. 2 is a schematic diagram illustrating a schematic configuration of an abnormality detection device according to the present embodiment. As illustrated in FIG. 2, the abnormality detection device 10 according to the present embodiment is implemented by a general-purpose computer, such as a personal computer, and includes an input unit 11, an output unit 12, a communication control unit 13, a storage unit 14, and a control unit 15.

The input unit 11 is implemented using an input device, such as a keyboard or a mouse, and inputs information on various types of instructions, such as a start of processing, to the control unit 15 in response to an input manipulation by a manipulator. The output unit 12 is implemented by a display device, such as a liquid crystal display, a print device, such as a printer, or the like. For example, a result of the abnormality detection processing or the abnormality monitor processing (to be described later) is displayed on the output unit 12.

The communication control unit 13 is implemented by an NIC (Network Interface Card) or the like and controls communication between an external device, such as the gateway device 3, and the control unit 15 via telecommunication lines, such as a LAN or the Internet.

The storage unit 14 is implemented by a semiconductor memory element, such as a RAM (Random Access Memory) or a flash memory, or a storage device, such as a hard disk or an optical disk. A processing program which causes the abnormality detection device 10 to operate, data used during execution of the processing program, and the like are stored in advance or temporarily stored on each occasion of processing in the storage unit 14. Note that the storage unit 14 may be configured to communicate with the control unit 15 via the communication control unit 13.

In the present embodiment, the storage unit 14 stores a communication feature 14a, reference value information 14b, an abnormality detection result 14c, setup information 14d, a combined group-unit communication feature 14e, test data 14f, and the like. The pieces of information are generated in the abnormality detection processing (to be described later) and are stored in the storage unit 14.

FIG. 3 is a chart for explaining the communication feature 14a. The communication feature 14a is obtained when an acquisition unit 15a (to be described later) acquires a communication feature of the communication equipment 2 as a processing object and accumulates the communication feature in the storage unit 14. As illustrated in FIG. 3, the communication feature 14a includes information of a 5-tuple. A 5-tuple refers to a source IP address, a source port number, a destination IP address, a destination port number, and a protocol. The communication feature 14a also includes information of various types of packet counts, such as a total upstream packet count or an average upstream packet count, and various types of byte counts, such as a total upstream byte count or an average upstream byte count.

Returning to the description of FIG. 2, the control unit 15 is implemented using a CPU (Central Processing Unit) or the like and executes the processing program stored in the memory. With the execution, the control unit 15 functions as the acquisition unit 15a, a count unit 15b, an amplification unit 15c, a creation unit 15d, a determination unit 15e, a selection unit 15f, a second creation unit 15g, a second determination unit 15h, and a second selection unit 15i, as illustrated in FIG. 2.

Note that the functional units may be implemented in different pieces of hardware or some thereof may be implemented in different hardware. For example, the second creation unit 15g, the second determination unit 15h, and the second selection unit 15i that execute second learning (to be described later) may be implemented in hardware different from that for the other functional units. Alternatively, the control unit 15 may include other functional units. For example, the control unit 15 may include an abnormality monitor unit which performs the abnormality monitor processing.

The acquisition unit 15a acquires a communication feature for normal communication of the communication equipment 2. For example, the acquisition unit 15a acquires a communication feature of communication data of the communication equipment 2 as a monitor object from the gateway device 3 via the input unit 11 or the communication control unit 13 and stores the communication feature in the communication feature 14a of the storage unit 14.

Note that, when the acquisition unit 15a identifies to which port of which gateway device 3 the communication equipment 2 as the monitor object is connected and to which layer 2 switch 4 the communication equipment 2 as the monitor object is connected, the acquisition unit 15a starts acquisition of a communication feature of the connected communication equipment 2.

The count unit 15b counts and stores the combined group-unit communication features 14e. Specifically, if a data count for communication features acquired by the acquisition unit 15a exceeds a predetermined value N1, the count unit 15b classifies the communication features by 5-tuple, makes a data count for each group sharing a same 5-tuple, and stores the communication features as the combined group-unit communication features 14e. Note that, in many cases of IP communication, ephemeral ports (e.g., ports 32768 to 61000 in many Linux® systems) are used as source port numbers. In this case, the count unit 15b regards a source port number as an arbitrary value (any) and includes any in a group sharing a same 5-tuple.

FIG. 4 is a chart for explaining a combined group-unit communication feature. For example, the fact that a 5-tuple of a communication feature classified under group 1 is a source IP address of "10.1.1.1," a source port number of "any," a destination IP address of "10.10.10.1," a destination port number of "80" and a protocol of "6" is shown in FIG. 4. The fact that a data count for group 1 is 10 is also shown.

If a data count or a data acquisition period for acquired communication features exceeds a predetermined value, the amplification unit 15c amplifies the data count for the communication features by a plurality of predetermined schemes in accordance with data counts for respective groups, each group sharing a same 5-tuple.

Specifically, the amplification unit 15c amplifies the data count for the communication features by the plurality of predetermined preprocessing schemes appropriate to the data counts for the respective groups. For example, the amplification unit 15c determines a preprocessing scheme by combining either one of a scheme for performing amplification while maintaining percentages of the data counts for the respective groups and a scheme for performing amplification so as to equalize the data counts for the respective groups and either one of a scheme for performing amplification by copying values of an acquired communication feature and a scheme for performing amplification by changing values of a communication feature except a 5-tuple by a percentage in a predetermined range.

FIG. 5 is a chart for explaining processing by the amplification unit 15c. Four preprocessing schemes A to D are illustrated in FIG. 5. As shown in FIG. 5, each preprocessing scheme is a scheme which is determined by combining either one of a simple amplification mode and an equal amplification mode and either one of two schemes, a copy scheme and an adjustment scheme.

The simple amplification mode is a scheme for performing amplification while maintaining the percentages of the data counts for the respective groups. In contrast, the equal amplification mode is a scheme for performing amplification so as to equalize the data counts for the respective groups.

The copy scheme is a scheme for performing amplification by copying values of an acquired communication feature. In contrast, the adjustment scheme is a scheme for performing amplification using similar data obtained by changing values of a communication feature except a 5-tuple by the percentage in the predetermined range.

Specifically, in preprocessing scheme A, the amplification unit 15c copies values of the acquired communication features to amplify the communication features for the predetermined count N1 to a predetermined count N2 while maintaining the percentages of the data counts for the respective groups, each sharing a same 5-tuple. Note that the predetermined count N2 is a data count which is referred to at timing of staring second learning (to be described later).

In preprocessing scheme B, the amplification unit 15c changes a value of a packet count, a byte count, a packet size, a flow rate, or a communication time period different than a 5-tuple by a percentage in predetermined increase-decrease range A to amplify the communication features for the predetermined count N1 to the predetermined count N2 while maintaining the percentages of the data counts for the respective groups, each sharing a same 5-tuple.

In preprocessing scheme C, the amplification unit 15c copies the values of the acquired communication features to amplify the communication features for the predetermined count N1 to the predetermined count N2 so as to equalize the data counts for the respective groups, each sharing a same 5-tuple.

In preprocessing scheme D, the amplification unit 15c changes a value of a packet count, a byte count, a packet size, a flow rate, or a communication time period different than a 5-tuple by a percentage in predetermined increase-decrease range B to amplify the communication features for the predetermined count N1 to the predetermined count N2 so as to equalize the data counts for the respective groups, each sharing a same 5-tuple.

Note that the amplification unit 15c may amplify the data count for the communication features if the data acquisition period for the communication features exceeds a predetermined value T1 instead of the data count N1 for the communication features. In this case, the amplification unit 15c amplifies the data count for the communication features to a data count corresponding to a predetermined data acquisition period T2 by preprocessing schemes A to D described above in accordance with the data counts for the respective groups, each sharing a same 5-tuple. Note that the predetermined data acquisition period T2 refers to a value which is referred to at timing of starting the second learning (to be described later).

Returning to the description of FIG. 2, the creation unit 15d creates, for each predetermined scheme, reference value information for normal communication of the communication equipment 2 through learning using amplified communication features. For example, the creation unit 15d performs, for each preprocessing scheme, first learning which uses communication features amplified from the predetermined count N1 to the predetermined count N2 to learn a statistical tendency of normal communication information through machine learning and creates reference value information.

The creation unit 15d stores created pieces of reference value information for the respective schemes in the reference value information 14b of the storage unit 14. The creation unit 15d also determines a threshold for determining whether an anomaly score is abnormal or normal and stores the threshold as, for example, the setup information 14d in the storage unit 14.

The determination unit 15e determines the accuracy of abnormality detection for each predetermined scheme using an anomaly score representing a deviation of test data representing a communication feature for abnormal communication from reference value information. For example, the determination unit 15e determines whether abnormality detection based on an anomaly score for test data is possible.

The determination unit 15e uses data for each group sharing a same 5-tuple to generate, as test data, a data set composed of a plurality of pieces of test data generated by varying a group, for which a communication feature except a 5-tuple is to be varied, and a value of the communication feature. For example, the determination unit 15e stepwise increases or decreases a value of a packet count, a byte count, a packet size, a flow rate, or a communication time period of the combined group-unit communication feature 14e as a basis which is obtained through compilation by the count unit 15b to generate a plurality of pieces of test data as abnormal communication features for each piece 2 of communication equipment and stores the plurality of pieces of test data as the pieces 14f of test data.

For example, the determination unit 15e uses the combined group-unit communication feature 14e that is a compiled value of normal communication features which is compiled by the count unit 15b to generate pieces of test data by varying, in the following manner, a packet count, a byte count, a packet size, a flow rate, or a communication time period.

The count unit 15b calculates and stores, for each group, average values for respective items, a total upstream packet count, a total upstream byte count, an average upstream packet size, an average upstream flow rate, a total downstream packet count, a total downstream byte count, an average downstream packet size, an average downstream flow rate, and a communication time period. The count unit 15b regards the calculated values as a data set for test data creation and stores the data set as a combined group-unit communication feature list.

A method for creating test data using data of a combined group-unit communication feature will be described here with reference to FIG. 4. Creation of test data is achieved by combining the following two: A) a method for choosing a group to be varied and B) a method for creating changed data.

A) Method for Choosing Group to Be Varied
- A-1) Focus on data of a count which is item No. 17 of each combined group-unit communication feature and choose a group with a highest count.
- A-2) Focus on data of a count which is item No. 17 of each combined group-unit communication feature and choose a group with a lowest count.
- A-3) Choose all group counts for combined group-unit communication features.
- A-4) Calculate and store variance together with an average value, focus on a total upstream packet count, a total upstream byte count, a total downstream packet count, and a total downstream byte count as a typical example of a case where anomalous communication occurs, and choose a group with variance having a small value.
- A-5) Calculate and store variance together with an average value, focus on a total upstream packet count, a total upstream byte count, a total downstream packet count, and a total downstream byte count as a typical example of a case where anomalous communication occurs, and choose a group with variance having a large value.
- A-6) An operator intentionally makes a determination in accordance with the operator's perspective.

B) Method for Creating Changed Data

A method for creating test data focused on a total upstream packet count, a total upstream byte count, a total downstream packet count, and a total downstream byte count as a typical example of a case where anomalous communication occurs will be described.
- B-1) In the case of varying a total upstream packet count, assume a phenomenon where an upstream packet count which is different from that at ordinary times is present in a source terminal and increase a total upstream packet count to result in an increase of 10%, an increase of 20%, an increase of 50%, an increase of 100%, and an increase of 200% compared to an average value of total upstream packet counts. Additionally, decrease the total upstream packet count to result in a decrease of 10%, a decrease of 20%, a decrease of 50%, a decrease of 100%, and a decrease of 200% compared to the average value of total upstream packet counts. Generate a total of ten pieces of data in this manner and set, as pieces of test data, a data set obtained by rewriting data of an average value of total upstream packet counts which is item No. 8 for a group selected in A) above. For example, if group 1 is selected, ten pieces of data different only in data of an average of total upstream packet counts which is item No. 8 are generated for data for group 1.
- B-2) In the case of varying a total upstream byte count, assume a phenomenon where an upstream data quantity which is different from that at ordinary times is present in a source terminal and increase a total upstream byte count to result in an increase of 10%, an increase of 20%, an increase of 50%, an increase of 100%, and an increase of 200% compared to an average value of total upstream byte counts. Additionally, decrease the total upstream byte count to result in a decrease of 10%, a decrease of 20%, a decrease of 50%, a decrease of 100%, and a decrease of 200% compared to the average value of total upstream byte counts. Generate a total of ten pieces of data in this manner and set the pieces of data as pieces of test data. Specifically, pieces of test data to be generated are generated in the manner described in B-1 above.
- B-3) In the case of varying a total downstream packet count, assume a phenomenon where a downstream packet count which is different from that at ordinary times is present in a source terminal and increase a total downstream packet count to result in an increase of 10%, an increase of 20%, an increase of 50%, an increase of 100%, and an increase of 200% compared to an average value of total downstream packet counts. Additionally, decrease the total downstream packet count to result in a decrease of 10%, a decrease of 20%, a decrease of 50%, a decrease of 100%, and a decrease of 200% compared to the average value of total downstream packet counts. Generate a total of ten pieces of data in this manner and set the pieces of data as pieces of test data. Specifically, pieces of test data to be generated are generated in the manner described in B-1 above.
- B-4) In the case of varying a total downstream byte count, assume a phenomenon where a downstream data quantity which is different from that at ordinary times is present in a source terminal and increase a total downstream byte count to result in an increase of 10%, an increase of 20%, an increase of 50%, an increase of 100%, and an increase of 200% compared to an average value of total downstream byte counts. Additionally, decrease the total downstream byte count to result in a decrease of 10%, a decrease of 20%, a decrease of 50%, a decrease of 100%, and a decrease of 200% compared to the average value of total downstream byte counts. Generate a total of ten pieces of data in this manner and set the pieces of data as pieces of test data. Specifically, pieces of test data to be generated are generated in the manner described in B-1 above.

Although forty pieces of data in B-1) to B-4) above may all be used or may be selectively used, generated test data is provided with a generation condition such that validity of a score which is a deviation from reference value information can be evaluated. For example, whether a score for data created by increasing a total upstream packet count for group 1 by 10% exceeds a threshold can be identified. This allows the abnormality detection device 10 to identify whether accuracy is high or low. Note that the level of accuracy may be automatically determined or the operator may determine the level of accuracy.

The determination unit 15e may generate test data using a database which is publicly available in relation to abnormal communication.

The determination unit 15e calculates anomaly scores for respective generated pieces of test data and determines, as the accuracy of abnormality detection for each scheme, whether the pieces of test data can be detected to be abnormal.

Alternatively, the determination unit 15e may determine, as accuracy, the degree to which a plurality of pieces of test data can be detected to be abnormal on the basis of anomaly scores. For example, the percentage of ones which can be detected to be abnormal to 100 generated pieces of test data as abnormal communication features may be used as the accuracy of abnormality detection for a scheme in question.

The determination unit 15e stores an abnormality detection result obtained through determination in the abnormality detection result 14c of the storage unit 14.

The selection unit 15f selects reference value information which is created by a scheme, determined accuracy for which is highest. For example, if the determination unit 15e determines, as the accuracy of abnormality detection, whether abnormality detection is possible, the selection unit 15f selects, as reference value information for the abnormality monitor processing, reference value information created by any of preprocessing schemes capable of abnormality detection of four preprocessing schemes A to D described above.

If abnormality detection is not possible with reference value information for any preprocessing scheme, the selection unit 15f selects, as the reference value information for the abnormality monitor processing, one with a highest percentage that is the percentage of ones which can be detected to be abnormal to a plurality of pieces of test data of the schemes, for example.

Alternatively, if the determination unit 15e uses the percentage of ones which can be detected to be abnormal to a plurality of pieces of test data as the accuracy of abnormality detection for each scheme, the selection unit 15f selects, as the reference value information for the abnormality monitor processing, reference value information created by a scheme with highest accuracy. The abnormality detection device 10 can obtain proper reference value information through the above-described first learning even if the quantity of collected communication information is small or a communication pattern is biased.

If a data count or a data acquisition period for acquired communication features exceeds a second predetermined value (N2 or T2) larger than the predetermined value (N1 or T1), the second creation unit 15g creates reference value information for normal communication of the communication equipment 2 through learning using the communication features. That is, if the data count for the acquired communication features exceeds the predetermined value N2 or if the data acquisition period exceeds the predetermined value T2, the second creation unit 15g performs second learning which uses the communication features to learn, through machine learning, a statistical tendency of normal communication information and creates reference value information, like the creation unit 15d described above.

The second creation unit 15g stores created reference value information in the reference value information 14b of the storage unit 14, like the creation unit 15d described above. The second creation unit 15g also determines a threshold for determining whether an anomaly score is abnormal or normal and stores the threshold in, for example, the setup information 14d of the storage unit 14.

The second determination unit 15h determines the accuracy of abnormality detection using an anomaly score representing a deviation of test data representing a communication feature for abnormal communication from reference value information. For example, the second determination unit 15h determines whether abnormality detection based on an anomaly score for test data is possible, like the determination unit 15e described above.

Alternatively, the second determination unit 15h may use data for each group sharing a same 5-tuple to generate, as test data, a data set composed of a plurality of pieces of test data generated by varying a group, for which a communication feature except a 5-tuple is to be varied, and a value of the communication feature, like the determination unit 15e described above. For example, the second determination unit 15h stepwise increases or decreases a value of a packet count, a byte count, a packet size, a flow rate, or a communication time period of a normal communication feature as a basis for each piece 2 of communication equipment which is acquired by the acquisition unit 15a to generate a plurality of pieces of test data as abnormal communication features for each piece 2 of communication equipment. The second determination unit 15h may determine, as accuracy, the degree to which the plurality of pieces of test data can be detected to be abnormal on the basis of anomaly scores.

Note that the second determination unit 15h may generate test data using a database which is publicly available in relation to abnormal communication. The second determination unit 15h stores an abnormality detection result obtained through determination in the abnormality detection result 14c of the storage unit 14.

The second selection unit 15i selects reference value information created by the second creation unit 15g if accuracy determined by the second determination unit 15h is not less than a predetermined threshold and changes a data count or a data acquisition period used for learning by the second creation unit 15g if the accuracy is less than the predetermined threshold.

For example, if the second determination unit 15h determines, as the accuracy of abnormality detection, whether abnormality detection is possible, the second selection unit 15i selects reference value information in a case where abnormality detection is possible as the reference value information for the abnormality monitor processing.

Alternatively, if the second determination unit 15h uses the percentage of ones which can be detected to be abnormal to a plurality of pieces of test data as the accuracy of abnormality detection, the second selection unit 15i selects, as the reference value information for the abnormality monitor processing, reference value information, accuracy for which is not less than the predetermined threshold.

On the other hand, if the accuracy determined by the second determination unit 15h is impossibility of abnormality detection or less than the predetermined threshold, the second selection unit 15i changes the data count or the data acquisition period used for learning by the second creation unit 15g. For example, the second selection unit 15i decreases the data count to less than N2, supplies the data count to the second creation unit 15g, and causes the second creation unit 15g to execute the second learning again. Alternatively, the second selection unit 15i decreases the data acquisition period to less than T2, supplies the data acquisition period to the second creation unit 15g, and causes the second creation unit 15g to execute the second learning again. This lightens a processing load of the second learning.

Note that the second selection unit 15i can also increase the data count or the data acquisition period used for the second learning for the second time by the second creation unit 15g. For example, the second creation unit 15g may further acquire a data count which corresponds to a range to be increased for the data count or the data acquisition period, and accumulate the data count in the communication feature 14a of the storage unit 14, before starting execution of the second learning for the first time.

That is, the second creation unit 15g may create reference value information for normal communication of the communication equipment 2 through learning using communication features for the second predetermined value in the following case. The following case is a case where a data count or a data acquisition period for acquired communication features exceeds the second predetermined value (N2 or T2) larger than the predetermined value (N1 or T1), and the second creation unit 15g further acquires communication features for a predetermined data count or data acquisition period. In this case, the second selection unit 15i can increase the data count or the data acquisition period used for learning by the second creation unit 15g if the accuracy of abnormality detection is less than the predetermined threshold. The abnormality detection device 10 can further increase the accuracy of reference value information by the above-described second learning.

[Abnormality Detection Processing]

Figure 6:
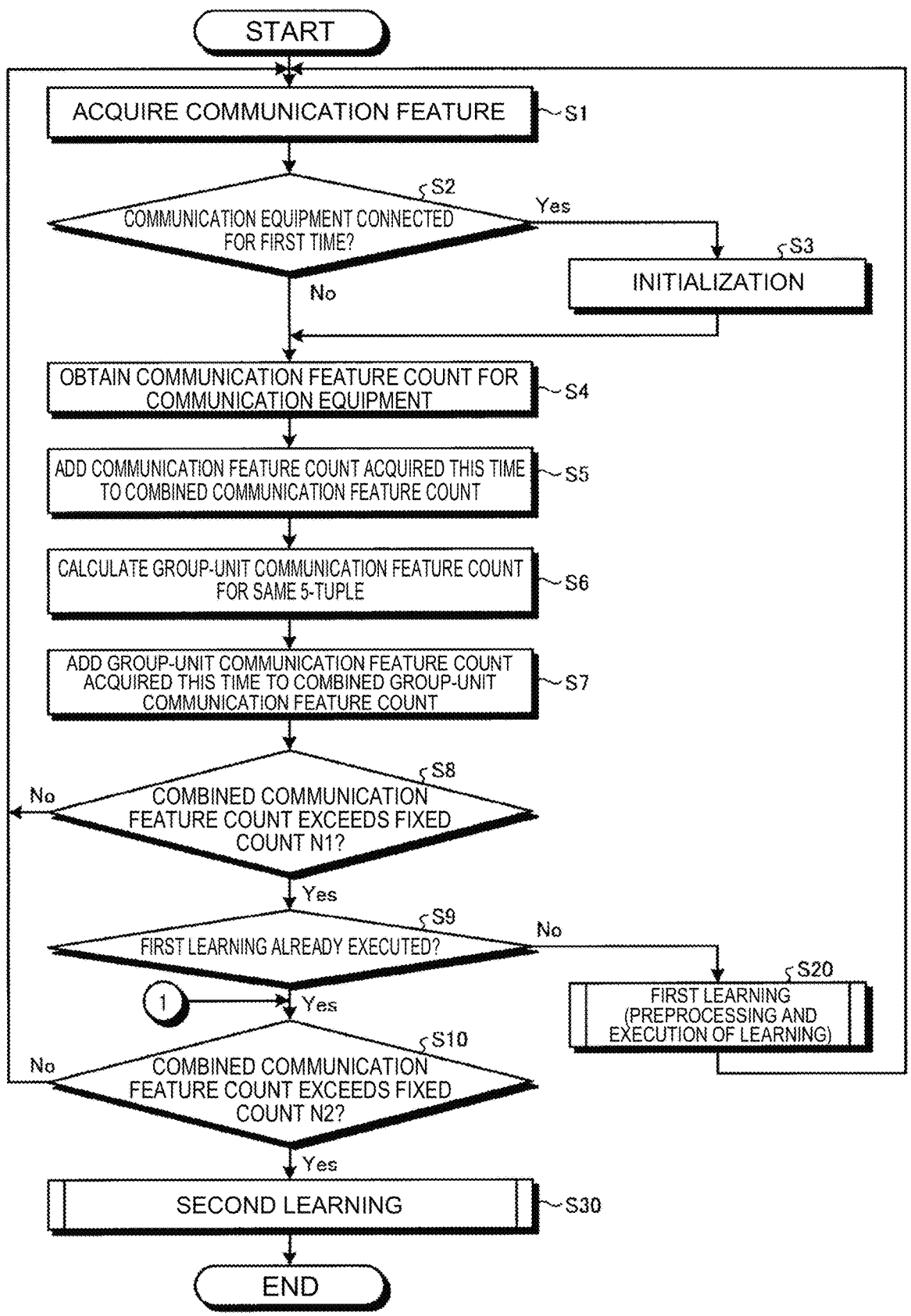
FIG. 6 is a flowchart showing an abnormality detection procedure.
Figure 7:
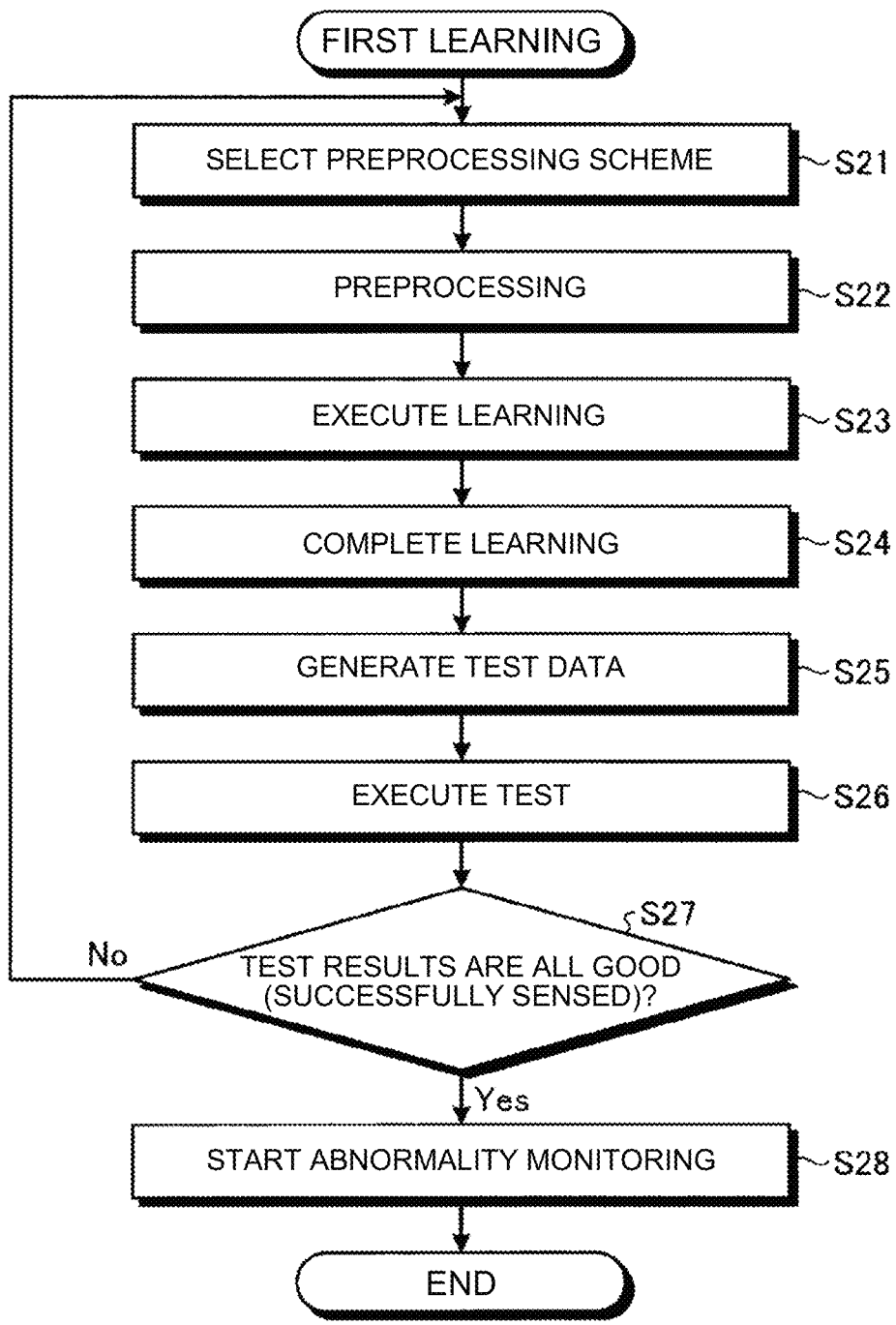
FIG. 7 is a flowchart showing the abnormality detection procedure.
Figure 8:
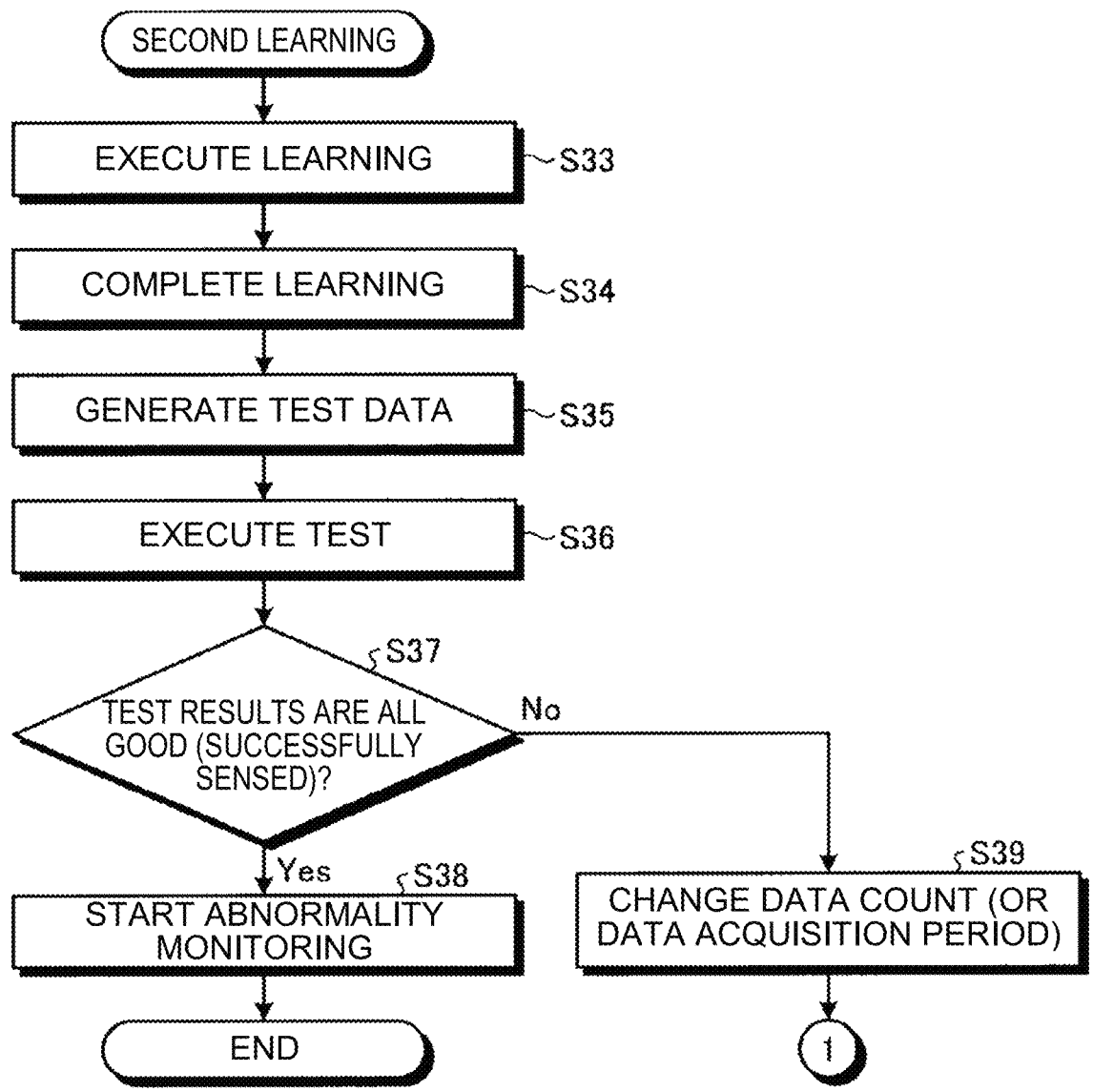
FIG. 8 is a flowchart showing the abnormality detection procedure.

The abnormality detection processing by the abnormality detection device 10 according to the present embodiment will be described with reference to FIGS. 6 to 8. FIGS. 6 to 8 are flowcharts indicating an abnormality detection procedure. The flowchart in FIG. 6 is started, for example, at timing when the abnormality detection device 10 senses connection of the communication equipment 2 as an abnormality monitor object.

First, the acquisition unit 15a acquires communication features for normal communication of the communication equipment 2 (step S1). For example, the acquisition unit 15a acquires communication features of communication data of the communication equipment 2 as the monitor object from the gateway device 3 via the input unit 11 or the communication control unit 13 and accumulates the communication features in the communication feature 14a of the storage unit 14.

In the case of first-time acquisition after the communication equipment 2 is connected (YES in step S2), the count unit 15b performs initialization (step S3), obtains the count of acquired communication features, and adds the count to a communication feature count for the communication equipment 2 (steps S4 and S5). The initialization is a process of zeroing the communication feature count and a group-unit communication feature count (to be described later).

Otherwise (NO in step S2), the count unit 15b does not perform the process in step S3, obtains the count of acquired communication features, and adds the count to the communication feature count for the communication equipment 2 (steps S4 and S5).

The count unit 15b classifies the communication features by 5-tuple, makes a data count for each 5-tuple, adds the data count to a group-unit communication feature count for the same 5-tuple, and stores the communication features in the combined group-unit communication feature 14e of the storage unit 14 (steps S6 and S7).

The acquisition unit 15a continues to acquire communication features of the communication equipment 2 (NO in step S8). If the communication features exceed the predetermined value N1 (YES in step S8), the first learning is executed (NO in step S9→step S20).

If the first learning is already executed (YES in step S9), the acquisition unit 15a continues to acquire communication features of the communication equipment 2 (NO in step S10). If the communication feature count exceeds the predetermined value N2 (YES in step S10), the second learning is executed (step S30). With this execution, the abnormality detection processing as a sequence ends.

FIG. 7 shows a procedure for the first learning in step S20 above. First, the amplification unit 15c refers to the combined group-unit communication features 14e described above, chooses any of preprocessing schemes A to D appropriate to the data counts for the respective groups, and amplifies the data count for communication features by the selected preprocessing scheme (steps S21 and S22).

The creation unit 15d creates, through learning using amplified communication features, reference value information for normal communication of the communication equipment 2 for the selected preprocessing scheme (steps S23 and S24).

The determination unit 15e generates a plurality of pieces of test data, compares each piece of test data with the reference value information to calculate an anomaly score, and executes a test to determine, as the accuracy of abnormality detection for the selected preprocessing scheme, whether the pieces of test data can be detected to be abnormal (steps S25 and S26).

If all the pieces of test data cannot be detected to be abnormal (NO in step S27), the selection unit 15f returns the process to step S21 to change to another preprocessing scheme. On the other hand, if all the pieces of test data can be detected to be abnormal, the selection unit 15f selects the reference value information for the preprocessing scheme as the reference value information for the abnormality monitor processing (YES in step S27). In this case, for example, the abnormality monitor unit starts the abnormality monitor processing (step S28). With this start, the first learning as a sequence ends.

Note that, if abnormality detection is not possible with reference value information for any preprocessing scheme, the selection unit 15f may select, as the reference value information for the abnormality monitor processing, one with a highest percentage that is the percentage of ones which can be detected to be abnormal to a plurality of pieces of test data of the preprocessing schemes, for example.

Alternatively, if the determination unit 15e uses the percentage of ones which can be detected to be abnormal to a plurality of pieces of test data as the accuracy of abnormality detection for each preprocessing scheme, the selection unit 15f may select, as the reference value information for the abnormality monitor processing, reference value information created by a scheme with highest accuracy.

In the above-described manner, the selection unit 15f selects reference value information which is created by a preprocessing scheme, determined accuracy for which is highest.

FIG. 8 shows a procedure for the second learning in step S30 above. First, the second creation unit 15g creates, through learning using communication features, reference value information for normal communication of the communication equipment 2 (steps S33 and S34).

The second determination unit 15h generates a plurality of pieces of test data, compares each piece of test data with the reference value information to calculate an anomaly score, and executes a test to determine, as the accuracy of abnormality detection, whether the pieces of test data can be detected to be abnormal (steps S35 and S36).

If all the pieces of test data cannot be detected to be abnormal (NO in step S37), the second selection unit 15i changes a data count or a data acquisition period used for learning by the second creation unit 15g (step S39) and returns the process to step S10 in FIG. 6.

For example, the second selection unit 15i decreases the data count to less than N2 or decreases the data acquisition period to less than T2 to execute the second learning again.

Note that the second selection unit 15$i$ can also increase the data count or the data acquisition period used for the second learning for the second time by the second creation unit 15$g$. For example, the second creation unit 15$g$ may return the process to step S1 and further acquire a data count which corresponds to a range to be increased for the data count or the data acquisition period, before execution of the second learning for the first time after the process in step S10 above.

That is, if a data count or a data acquisition period for acquired communication features exceeds the second predetermined value (N2 or T2) larger than the predetermined value (N1 or T1), and the second creation unit 15$g$ further acquires communication features for a predetermined data count or data acquisition period, the second creation unit 15$g$ starts the second learning. In this case, the second selection unit 15$i$ can increase the data count or the data acquisition period used for the second learning for the second time by the second creation unit 15$g$.

On the other hand, if all the pieces of test data can be detected to be abnormal, the selection unit 15$f$ selects the reference value information for the preprocessing scheme as the reference value information for the abnormality monitor processing (YES in step S37). In this case, for example, the abnormality monitor unit starts the abnormality monitor processing (step S38). With this start, the second learning as a sequence ends.

Note that, if the second determination unit 15$h$ uses the percentage of ones which can be detected to be abnormal to a plurality of pieces of test data as the accuracy of abnormality detection, the second selection unit 15$i$ may select the reference value information created by the second creation unit 15$g$ when the accuracy is not less than the predetermined threshold.

As has been described above, in the abnormality detection device 10 according to the present embodiment, the acquisition unit 15$a$ acquires communication features for normal communication of the communication equipment 2. If a data count or a data acquisition period for the acquired communication features exceeds the predetermined value, the amplification unit 15$c$ amplifies the data count for the communication features by the plurality of predetermined schemes in accordance with the data counts for the respective groups, each sharing a same 5-tuple. The creation unit 15$d$ creates, for each predetermined scheme, reference value information for normal communication of the communication equipment 2 through learning using amplified communication features. The determination unit 15$e$ determines the accuracy of abnormality detection for each predetermined scheme using an anomaly score representing a deviation of test data representing a communication feature for abnormal communication from the reference value information. The selection unit 15$f$ selects reference value information which is created by a scheme, determined accuracy for which is highest.

With the above-described configuration, the abnormality detection device 10 can create reference value information through learning using data amplified by an optimum scheme even if the quantity of communication information collected to create reference value information is small or a communication pattern is biased. Thus, use of reference value information created by the abnormality detection device 10 allows an early start of abnormality monitoring. As described above, the abnormality detection device 10 is capable of easily applying an anomaly-based one to abnormality detection.

In the abnormality detection device 10, if a data count or a data acquisition period for acquired communication features exceeds the second predetermined value (N2 or T2) larger than the predetermined value (N1 or T1), the second creation unit 15$g$ creates reference value information for normal communication of the communication equipment 2 through learning using the communication features. The second determination unit 15$h$ determines the accuracy of abnormality detection using an anomaly score representing a deviation of test data representing a communication feature for abnormal communication from the reference value information. The second selection unit 15$i$ selects the reference value information created by the second creation unit 15$g$ if the accuracy determined by the second determination unit 15$h$ is not less than the predetermined threshold and changes a data count or a data acquisition period used for learning by the second creation unit 15$g$ if the accuracy is less than the predetermined threshold.

The above-described second learning allows the abnormality detection device 10 to select reference value information with higher accuracy.

The determination unit 15$e$ determines, as the accuracy of abnormality detection, the degree to which a plurality of pieces of test data can be detected to be abnormal on the basis of anomaly scores. The second determination unit 15$h$ determines, as accuracy, the degree to which a plurality of pieces of test data can be detected to be abnormal on the basis of anomaly scores. This allows the abnormality detection device 10 to select reference value information with even higher accuracy.

If a data count or a data acquisition period for acquired communication features exceeds the second predetermined value (N2 or T2) larger than the predetermined value (N1 or T1), and the second creation unit 15$g$ further acquires communication features for a predetermined data count or data acquisition period, the second creation unit 15$g$ creates reference value information for normal communication of communication equipment through learning using communication features for the second predetermined value. In this case, if accuracy determined by the second determination unit 15$h$ is less than the predetermined threshold, the second selection unit 15$i$ can increase a data count or a data acquisition period used for learning by the second creation unit 15$g$. As described above, the abnormality detection device 10 can select reference value information with even higher accuracy by selecting one with highest accuracy from among pieces of reference value information created by the plurality of preprocessing schemes.

The amplification unit 15$c$ determines a preprocessing scheme by combining either one of a scheme for performing amplification while maintaining the percentages of the data counts for the respective groups, each sharing a same 5-tuple, and a scheme for performing amplification so as to equalize the data counts for the respective groups and either one of a scheme for performing amplification by copying values of an acquired communication feature and a scheme for performing amplification by changing values of a communication feature except a 5-tuple by a percentage in a predetermined range. This allows the abnormality detection device 10 to select reference value information with even higher accuracy.

[Program]

It is also possible to create a program obtained by describing processing to be executed by the abnormality detection device 10 according to the above-described embodiment in a computer-executable language. As an embodiment, the abnormality detection device 10 can be implemented by installing an abnormality detection program which executes the above-described abnormality detection processing as package software or online software on a desired computer. For example, an information processing device can be made to function as the abnormality detection device 10 by causing the information processing device to execute the abnormality detection program. Information processing devices here include a desktop or notebook personal computer. Additionally, a mobile communication terminal, such as a smartphone, a cellular phone handset or a PHS (Personal Handyphone System), and a slate terminal, such as a PDA (Personal Digital Assistant), fall into the category of information processing device. The functions of the abnormality detection device 10 may be implemented in a cloud server.

Figure 9:
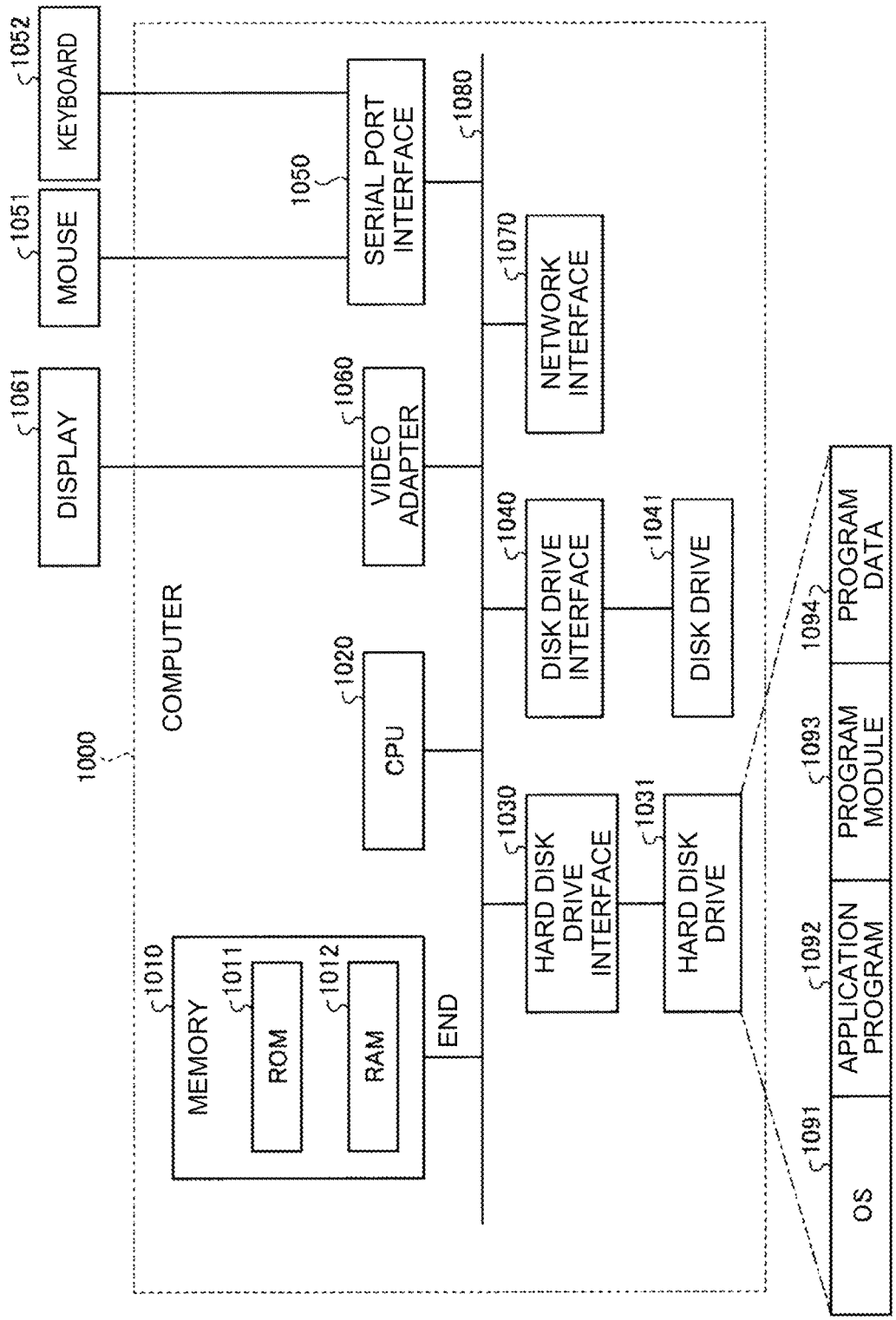
FIG. 9 is a diagram showing an example of a computer which executes an abnormality detection program.

FIG. 9 is a diagram showing an example of a computer which executes the abnormality detection program. A computer 1000 has, for example, a memory 1010, a CPU 1020, a hard disk drive interface 1030, a disk drive interface 1040, a serial port interface 1050, a video adapter 1060, and a network interface 1070. The units are connected by a bus 1080.

The memory 1010 includes a ROM (Read Only Memory) 1011 and a RAM 1012. The ROM 1011 stores, for example, a boot program, such as a BIOS (Basic Input Output System). The hard disk drive interface 1030 is connected to a hard disk drive 1031. The disk drive interface 1040 is connected to a disk drive 1041. For example, a removable storage medium, such as a magnetic disk or an optical disk, is inserted into the disk drive 1041. For example, a mouse 1051 and a keyboard 1052 are connected to the serial port interface 1050. For example, a display 1061 is connected to the video adapter 1060.

The hard disk drive 1031 stores, for example, an OS 1091, an application program 1092, a program module 1093, and program data 1094. The pieces of information described in the above-described embodiment are stored in, for example, the hard disk drive 1031 and the memory 1010.

The abnormality detection program is, for example, stored as the program module 1093, in which an instruction to be executed by the computer 1000 is described, in the hard disk drive 1031. Specifically, the program module 1093, in which the processes described in the embodiment to be executed by the abnormality detection device 10 are described, is stored in the hard disk drive 1031.

Data which is used for information processing by the abnormality detection program is stored as the program data 1094 in, for example, the hard disk drive 1031. The CPU 1020 loads the program module 1093 and the program data 1094 stored in the hard disk drive 1031 into the RAM 1012 as needed, thereby executing the above-described procedures.

Note that the program module 1093 and the program data 1094 associated with the abnormality detection program are not always stored in the hard disk drive 1031. For example, the program module 1093 and the program data 1094 may be stored in a removable storage medium and be read via the disk drive 1041 or the like by the CPU 1020. Alternatively, the program module 1093 and the program data 1094 associated with the abnormality detection program may be stored in a different computer connected via a network, such as a LAN or a WAN (Wide Area Network), and be read via the network interface 1070 by the CPU 1020.

Although the embodiment to which the invention made by the present inventors is applied has been described, the present invention is not limited to the description and the drawings of the present embodiment that form part of the disclosure of the present invention. That is, other embodiments, examples, operational techniques, and the like which are implemented on the basis of the present embodiment by those skilled in the art are all included in the scope of the present invention.

REFERENCE SIGNS LIST

1 System
2 Communication equipment
3 Gateway device
4 Layer 2 switch
10 Abnormality detection device
11 Input unit
12 Output unit
13 Communication control unit
14 Storage unit
14*a* Communication feature
14*b* Reference value information
14*c* Abnormality detection result
14*d* Setup information
14*e* Combined group-unit communication feature
14*f* Test data
15 Control unit
15*a* Acquisition unit
15*b* Count unit
15*c* Amplification unit
15*d* Creation unit
15*e* Determination unit
15*f* Selection unit
15*g* Second creation unit
15*h* Second determination unit
15*i* Second selection unit

The invention claimed is:

1. An abnormality detection device comprising:
a memory; and
a processor coupled to the memory and programmed to execute a process comprising:
acquiring a communication feature for normal communication of communication equipment;
amplifying, if a data count or a data acquisition period for the acquired communication feature exceeds a predetermined value, the data count for a communication feature by a plurality of predetermined schemes in accordance with data counts for respective groups, each group sharing a same 5-tuple;
creating, for each of the predetermined schemes, reference value information for normal communication of the communication equipment through learning using the amplified communication feature;
determining accuracy of abnormality detection for each of the predetermined schemes using an anomaly score representing a deviation of test data representing a communication feature for abnormal communication from the reference value information; and
selecting the reference value information created by one of the schemes, the determined accuracy for which is highest.

2. The abnormality detection device according to claim 1, wherein the determining determines, as the accuracy, a degree to which a plurality of pieces of test data constituting the test data can be detected to be abnormal on the basis of an anomaly score.

3. The abnormality detection device according to claim 1, wherein the determining uses data for each group sharing the same 5-tuple to generate, as the test data, a data set composed of a plurality of pieces of test data generated by varying a group, for which the communication feature except the 5-tuple is to be varied, and a value of the communication feature.

4. The abnormality detection device according to claim 1, wherein the process further comprises:

secondary creating, if the data count or the data acquisition period for the acquired communication feature exceeds a second predetermined value larger than the predetermined value, reference value information for normal communication of the communication equipment through learning using the communication feature;

secondary determining accuracy of abnormality detection using an anomaly score representing a deviation of test data representing a communication feature for abnormal communication from the reference value information; and secondary selecting the reference value information created by the secondary creating if the accuracy determined by the secondary determining is not less than a predetermined threshold and changes a data count or a data acquisition period used for learning by the secondary creating if the accuracy is less than the predetermined threshold.

5. The abnormality detection device according to claim 4, wherein if the data count or the data acquisition period for the acquired communication feature exceeds the second predetermined value larger than the predetermined value, and the secondary creating further acquires the communication feature for a predetermined data count or data acquisition period, the secondary creating creates reference value information for normal communication of the communication equipment through learning using a communication feature for the second predetermined value, and the secondary selecting increases the data count or the data acquisition period used for learning by the secondary creating if the accuracy is less than the predetermined threshold.

6. The abnormality detection device according to claim 1, wherein the amplifying determines one of the schemes by combining either one of a scheme for performing amplification while maintaining percentages of the data counts for the respective groups and a scheme for performing amplification so as to equalize the data counts for the respective groups and either one of a scheme for performing amplification by copying a value of the acquired communication feature and a scheme for performing amplification by changing a value of the communication feature except a 5-tuple by a percentage in a predetermined range.

7. An abnormality detection method to be executed by an abnormality detection device, the method comprising:

an acquiring step of acquiring a communication feature for normal communication of communication equipment;

an amplifying step of, if a data count or a data acquisition period for the acquired communication feature exceeds a predetermined value, amplifying the data count for a communication feature by a plurality of predetermined schemes in accordance with data counts for respective groups, each group sharing a same 5-tuple;

a creating step of creating, for each of the predetermined schemes, reference value information for normal communication of the communication equipment through learning using the amplified communication feature;

a determining step of determining accuracy of abnormality detection for each of the predetermined schemes using an anomaly score representing a deviation of test data representing a communication feature for abnormal communication from the reference value information; and a selecting step of selecting the reference value information created by one of the schemes, the determined accuracy for which is highest.

8. A non-transitory computer-readable recording medium having stored an abnormality detection program for causing a computer to execute:

an acquiring step of acquiring a communication feature for normal communication of communication equipment;

an amplifying step of, if a data count or a data acquisition period for the acquired communication feature exceeds a predetermined value, amplifying the data count for a communication feature by a plurality of predetermined schemes in accordance with data counts for respective groups, each group sharing a same 5-tuple;

a creating step of creating, for each of the predetermined schemes, reference value information for normal communication of the communication equipment through learning using the amplified communication feature;

a determining step of determining accuracy of abnormality detection for each of the predetermined schemes using an anomaly score representing a deviation of test data representing a communication feature for abnormal communication from the reference value information; and a selecting step of selecting the reference value information created by one of the schemes, the determined accuracy for which is highest.

* * * * *